UNITED STATES PATENT OFFICE.

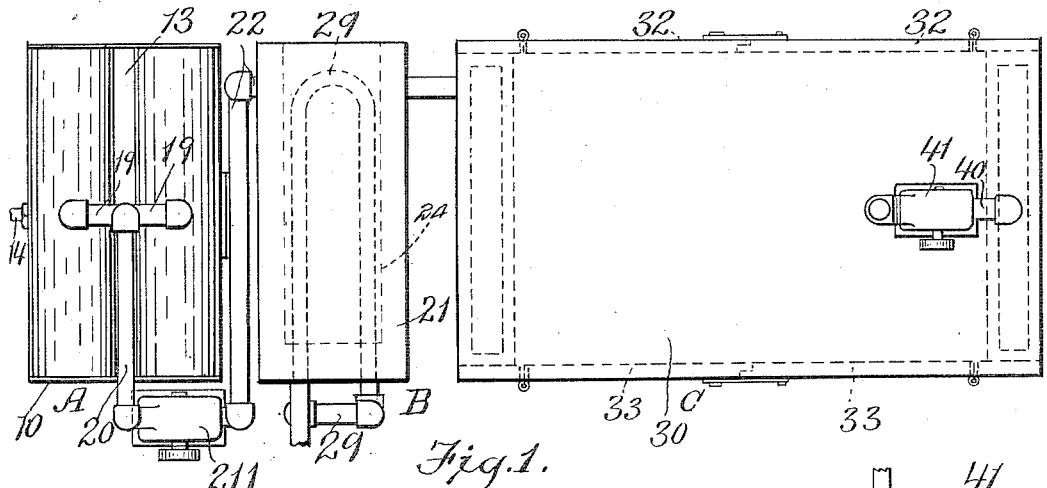
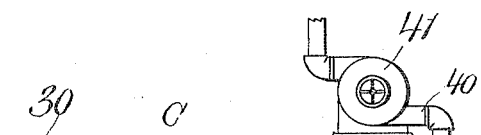
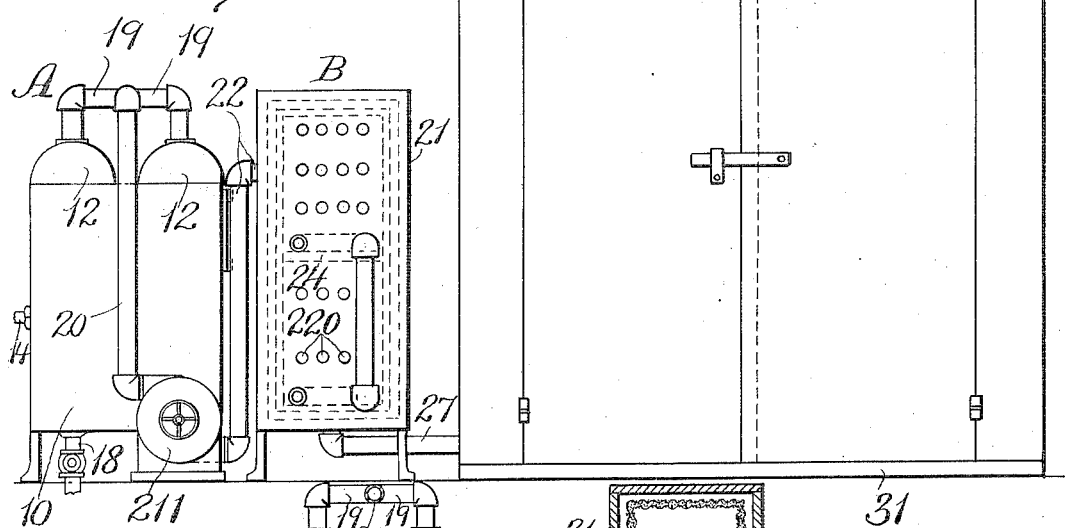
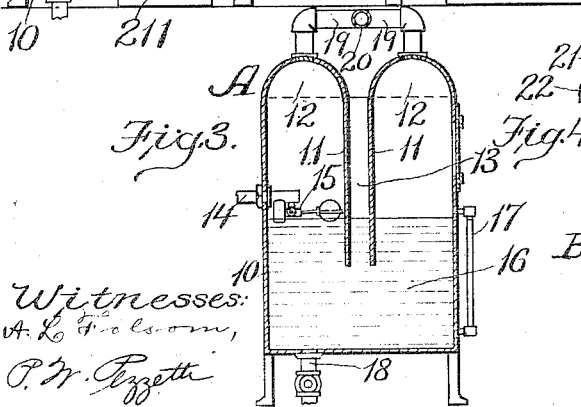
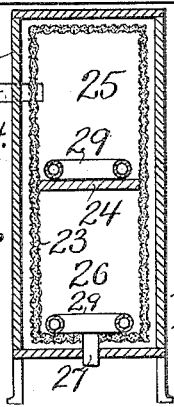

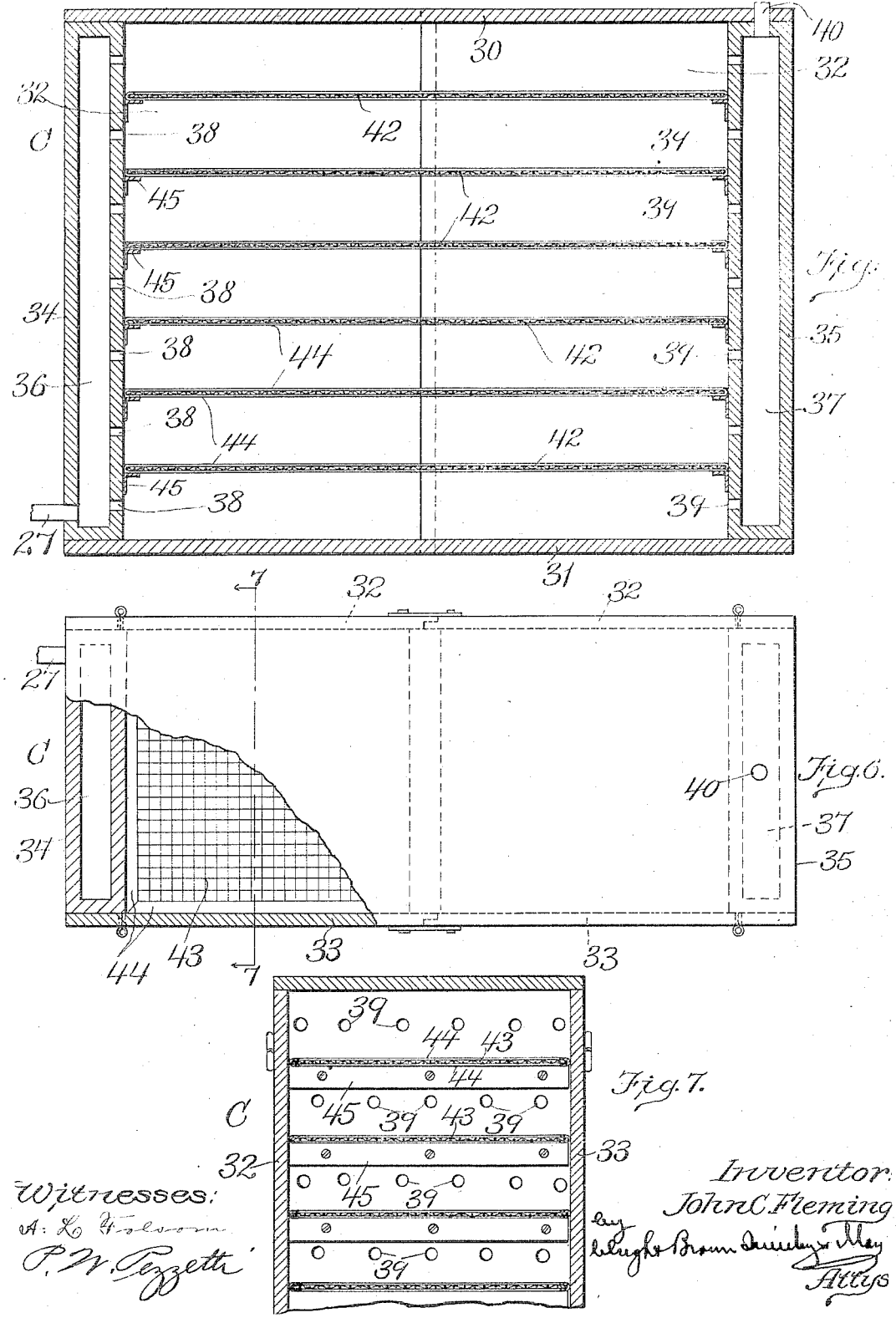

JOHN C. FLEMING, OF BOSTON, MASSACHUSETTS.

DRIER.

1,099,122.　　　　Specification of Letters Patent.　　Patented June 2, 1914.

Application filed January 22, 1913. Serial No. 743,517.

*To all whom it may concern:*

Be it known that I, JOHN C. FLEMING, a citizen of the United States, and resident of Boston, in the county of Suffolk and State of Massachusetts, have invented certain new and useful Improvements in Driers, of which the following is a specification.

The object of this invention is to provide a drying apparatus by means of which substances, materials or articles to be dried may be subjected to a current of air which has been cleaned of carbon and other impurities and from which the moisture has been eliminated.

On the accompanying drawings, Figure 1 represents in plan view instrumentalities which may be utilized in carrying out the invention. Fig. 2 represents a side elevation of the same. Fig. 3 represents in section the apparatus containing the liquid through which the air is drawn to free it from impurities. Fig. 4 represents a section through the apparatus in which the air is heated and the moisture is removed. Fig. 5 represents in section the apparatus in which the articles to be dried may be placed and in which they will be subjected to the action of the purified and heated air. Fig. 6 represents a plan view of the same. Fig. 7 represents a section on the line 7—7 of Fig. 6.

According to my invention, the air is first drawn through a body of liquid for the removal of carbon, dust and other foreign matter. Any suitable liquid may be utilized for the purpose although I preferably employ an alkaline solution such as potassium carbonate. After being drawn through the body of liquor, the air is heated and is brought into contact with a body of material which is capable of absorbing the moisture so that the air will be thoroughly dried. I find that the best results are secured by the employment of prepared animal charcoal or other absorbents. After being heated and dried, the air is then delivered to a drying chamber into which the articles or substances to be dried may be placed.

On the accompanying drawings, which illustrate instrumentalities which I have found to be suitable for the purpose, A indicates the apparatus used for freeing the air from impurities, B indicates the apparatus by which the air is heated and dried, and C indicates the apparatus into which the articles to be dried by the air may be placed.

The apparatus indicated generally at A consists of a tank 10 having side walls which are curved inwardly and downwardly as at 11 to form two domes 12, 12 which are separated by a space shown at 13. The cleaning solution is delivered to the casing by a conduit 14 controlled by a float valve 15 so as to maintain the body of liquid 16 at the level indicated. For convenience, the apparatus may be provided with a gage 17 and with a valved eduction pipe 18. Leading from the tops of the domes 12 12 are the pipes or conduits 19 connected with the conduit 20 leading to an exhaust fan 211. From the outlet of the fan or pump 211 extends a conduit 22 to the apparatus B. It will be seen that, when the pump or fan is set in motion, air will be drawn downwardly through the space 13 between the domes and through the body of liquid in the domes and forced by the pump into the apparatus B.

The apparatus B preferably consists of a casing 21 having top, bottom, side and end walls, the end walls being perforated as indicated at 220 in Fig. 2. Within the casing I provide an inner casing 23, the walls of which are formed by parallel layers of fine wire holding between them a mass of prepared animal charcoal. The charcoal is preferably fairly coarse, the individual pieces being approximately the side of peas. Between the two casings there is an air space for the free circulation of the external atmosphere which is admitted and discharged through the apertures 220. Preferably the air chamber, formed by the charcoal casing 23, is divided by a horizontal partition 24 which extends nearly the entire length of the inner casing so as to divide it into two compartments 25 26. Air delivered to one end of the compartment will travel throughout the length thereof, thence downwardly beyond the end of the partition 24 into the lower compartment and back to the other end of the compartment 26 where it will be discharged through a pipe 27. The conduit 22 passes through the two casings 21 and 23 so as to discharge the air into the end of the upper compartment 25, and the eduction conduit 27 likewise projects through the two casings so as to withdraw the air from the compartment 26. In the two compartments I place a suitable heater such as steam coils 29 29 to which steam at the desired pressure may be delivered through suitable conducting pipes to heat the current of air and the charcoal to the necessary temperature.

It will be understood that the heater and drier B will be of any suitable length, so that, as the air is caused to travel therethrough, it will be brought into contact with the charcoal for the removal of the moisture.

The drying chamber C is preferably made with top and bottom walls 30 31. The front and rear walls are formed by hinged doors 32 32, 33 33 constructed to prevent the entrance of air into the casing. The ends of the casing are made hollow as at 34 35. In these double walls are formed air chambers 36 37 which communicate with the interior of the casing by ports 38 39. The pipe 27 communicates with the chamber 36 so that the purified and dried air will be delivered to the interior of the casing through the ports 38. Leading from the chamber 37 there is an eduction pipe 40 communicating with an exhaust fan or pump 41, so that a circulation of air is maintained through the drier. Within the casing there are removable shelves indicated at 42. For convenience, each shelf consists of foraminous material such as a wire fabric 43 having its edges reinforced with strips 44 of metal such as sheet iron. These shelves rest upon brackets 45. Preferably the fan or pump 41 is operated at higher speed than that at 21.

In operation, the materials which are to be dried are placed upon the shelves in the apparatus C, the doors thereof are closed, and the pumps are set in motion. As the air is drawn through the body of the purifying solution, it is completely freed from foreign gases, dust, carbon and all impurities. On being delivered to the apparatus B, it is caused to come in contact with the heated bone charcoal as it traverses the chambers of the apparatus, and the moisture previously contained in the air is absorbed. As there is a free circulation of cool air around the exterior of the charcoal casing, the moisture evaporated from the outer portion of the charcoal is carried away by the outside air. When the air is delivered from the apparatus B to the apparatus C, it is distributed through the drying chamber in the latter, the articles being completely enveloped in a moving body of purified, dried and heated air. It is quite evident that, if desired, I may omit the apparatus C and deliver the air to a room or other chamber to be heated and ventilated. The inner portion of the charcoal causes the absorption of the moisture in the purified air, but, since the charcoal is exposed to the exterior atmosphere, the absorbed moisture evaporates from the outer portions of the charcoal, so that, as it were, the moisture passes through the charcoal wall and is taken up by the outside air, especially as the outer portion of the charcoal is cool and action of the heat inside the casing causes the moisture to pass to the cooler portion of the charcoal.

What I claim is:—

1. The combination with a purifying apparatus containing a body of purifying liquid through which the air is caused to pass, of a drier for the air consisting of a casing into which the purified air is introduced, composed of prepared animal charcoal the exterior of which is exposed to the atmosphere, a heater for heating said charcoal, and means for causing a stream of air to pass through said purifying apparatus and said drier.

2. In combination, an air chamber sealed by a purifying liquid, a pump connected with the air chamber, and an air drier communicating with the pump, said pump being located between the drier and the air chamber whereby the air passing through the liquid in the air chamber because of the partial vacuum created by the pump is forced by said pump into the drier free from all impurities.

3. The combination with a casing adapted to contain a body of liquid and having a chamber sealed by the liquid, a pump for drawing air through the liquid into the chamber, and a drier to which the air is delivered by said pump, said drier consisting of an open casing having an interior casing whose walls are formed of absorbent material capable of absorbing the moisture contained in the air.

4. A drier for previously purified air, consisting of an inner casing composed of double walls of foraminous material having a layer of animal charcoal between them, means for heating the charcoal, and an exterior open protective casing through which air is admitted to the exterior of said inner casing.

5. The combination of a liquid sealed casing, a pump for drawing air through the liquid to purify the same, a drier to which the air is delivered, said drier consisting of a casing exposed to the exterior atmosphere and formed of material capable of absorbing the moisture contained in the purified air, means for heating said air in said casing, and a casing connected to the air-drying apparatus to receive the air therefrom, formed for the reception of articles to be dried by the said heated and purified air.

6. In combination, an air chamber sealed by a purifying liquid, an air drier for absorbing the moisture contained in the air, a pump located between and communicating with the air chamber and the drier, for drawing air through the purifying liquid and forcing it through the drier, a casing communicating with the drier to receive the dried air therefrom and forming a compartment for materials to be dried, and an exhaust pump communicating with said last-mentioned chamber for rarefying the air therein and removing the air laden with moisture liberated by such material in said chamber.

In testimony whereof I have affixed my signature, in presence of two witnesses.

JOHN C. FLEMING.

Witnesses:
G. L. JOHNSON,
P. W. PEZZETTI.